`US007741748B2`

(12) United States Patent
Baumann

(10) Patent No.: US 7,741,748 B2
(45) Date of Patent: Jun. 22, 2010

(54) DEVICE FOR IMPROVING THE PROTECTION OF A CONSTRUCTION UNIT AGAINST ELECTRICAL CORONA DISCHARGES

(75) Inventor: Thomas Baumann, Wettingen (CH)

(73) Assignee: Alstom Technology Ltd, Baden (CH)

( * ) Notice: Subject to any disclaimer, the term of this patent is extended or adjusted under 35 U.S.C. 154(b) by 914 days.

(21) Appl. No.: 11/263,684

(22) Filed: Nov. 1, 2005

(65) Prior Publication Data

US 2006/0097600 A1    May 11, 2006

(30) Foreign Application Priority Data

Nov. 1, 2004    (CH) .................................... 1803/04

(51) Int. Cl.
*H02K 15/12* (2006.01)
(52) U.S. Cl. ............................. 310/196; 174/DIG. 22; 174/DIG. 28
(58) Field of Classification Search ................. 310/194, 310/196, 215, 45; 174/DIG. 22, DIG. 28; 250/324

See application file for complete search history.

(56) References Cited

U.S. PATENT DOCUMENTS

| 4,207,482 | A | * | 6/1980 | Neumeyer et al. ............ 310/45 |
| 4,473,765 | A | * | 9/1984 | Butman et al. ............... 310/215 |
| 5,341,561 | A | * | 8/1994 | Schorm et al. ................ 29/596 |
| 5,723,920 | A | | 3/1998 | Markovitz et al. ............ 310/42 |
| 2005/0133720 | A1 | * | 6/2005 | Russel et al. ................. 250/324 |
| 2005/0194551 | A1 | * | 9/2005 | Klaussner et al. ......... 250/505.1 |

FOREIGN PATENT DOCUMENTS

DE          1 030 438         5/1958

OTHER PUBLICATIONS

International Search Report for CH 01803/04 (4 pages) and brief translation thereof (1 page), Mar. 2005.

* cited by examiner

*Primary Examiner*—Dang D Le
(74) *Attorney, Agent, or Firm*—Leydig, Voit & Mayer, Ltd.

(57) ABSTRACT

A device for improving the protection of a component against surface discharges includes a non-woven substrate made of fibers and configured to be electrically insulating and a coating containing silicon carbide (SiC) disposed on the substrate.

10 Claims, 2 Drawing Sheets

DEVICE FOR IMPROVING THE PROTECTION OF A CONSTRUCTION UNIT AGAINST ELECTRICAL CORONA DISCHARGES

The present invention relates to a device for improving the protection of a component against electrical coronal discharges, especially to an overhang corona protection device.

BACKGROUND

Rotating electric machines such as, for example, generators, usually have a rotating rotor and a stationary stator, both the rotor and the stator having a plurality of windings made of electrically conductive material. Electric current flows through the windings on the stator as well as through those on the rotor. In order to ensure a malfunction-free operation of the generator or of the electric motor, the windings of the stator or of the rotor have to be electrically insulated. The insulation as such, however, does not offer sufficient protection against surface discharges, that is to say, against damage, especially destruction, caused by electric discharges on the surface of the insulation. Corona protection devices are known for protecting the components at the relevant places from such electric discharges—also called corona discharges. Such a corona shield is arranged on the surface of the insulation to be protected and it has a weak electric conductivity that can be achieved, for example, through the addition of graphite and/or carbon black. Normally, such corona protection devices have a woven substrate as well as a corona protection coating applied thereupon.

SUMMARY OF THE INVENTION

The present invention relates to the objective of providing an improved embodiment for a device of the above-mentioned type by means of which, in particular, an effective corona protection can be achieved inexpensively and so as to be easily adaptable in terms of its dimensions.

The invention is based on the general notion of making a device for improving the protection of a component against electric surface discharges, especially an overhang corona protection device, out of a non-woven, electrically insulating and fibrous substrate onto which a coating containing silicon carbide (SiC) is applied. The non-woven substrate made of fibers offers the major advantage that it can be produced much less expensively than woven substrates and moreover, it can easily be cut and draped without fraying at the edges. Furthermore, it can also be easily adapted to the width of the requisite mica tapes since they can easily be cut by a cutting machine into the desired widths while, at the same time, retaining an edge that is crisp and not frayed, which allows a reliable and high-quality corona protection of the component.

On the basis of a first embodiment of the solution according to the invention, the coating containing silicon carbide is a curable or already cured varnish containing silicon carbide grains. Such a configuration of the coating offers the advantage that the substrate can be coated easily in a dip varnishing procedure and can thus be made quickly and inexpensively. Moreover, due to the fact that the coating can be varnished, an especially high and uniform quality of the coating can be ensured, which translates into an especially effective protection of the component against electric surface discharges.

Advantageously, the fibers of the substrate are held together by a binder. The bonding of the fibers can be executed, for instance, as thermal and/or chemical bonding. This allows the use of a binder that is aimed at the particular application case and thus permits an especially high flexibility in terms of the binders or materials used.

According to another embodiment, the device is an overhang corona protection tape. Such an overhang corona shield protects those parts of the conductor bars that are still in the stator but that are already outside of the stator slots that serve to accommodate the conductor bars. Outside of the stator, the individual conductor bars are connected to each other in the so-called stator end winding in order to form a closed winding.

In another embodiment of the invention, the substrate consists of polyester fibers. Polyester fibers can be produced inexpensively in virtually any size and shape and can easily be bonded by device of a chemical binder to form a non-woven, cloth-like substrate. Here, another conceivable approach is a thermal bond in which the polyester is heated in order to create the bond. Since polyester fibers can be produced inexpensively, they can also be used to cost-effectively produce the corona protection device.

Additional features and advantages of the device according to the invention can be gleaned from the claims, from the drawings and from the accompanying figure description, with reference to the drawings.

BRIEF DESCRIPTION OF THE DRAWINGS

Preferred embodiments of the invention are shown in the drawings and are explained in greater depth in the description below, whereby the same reference numerals are employed for the same or similar or functionally equivalent components. The following is shown in schematic form.

DETAILED DESCRIPTION

Figure 1:
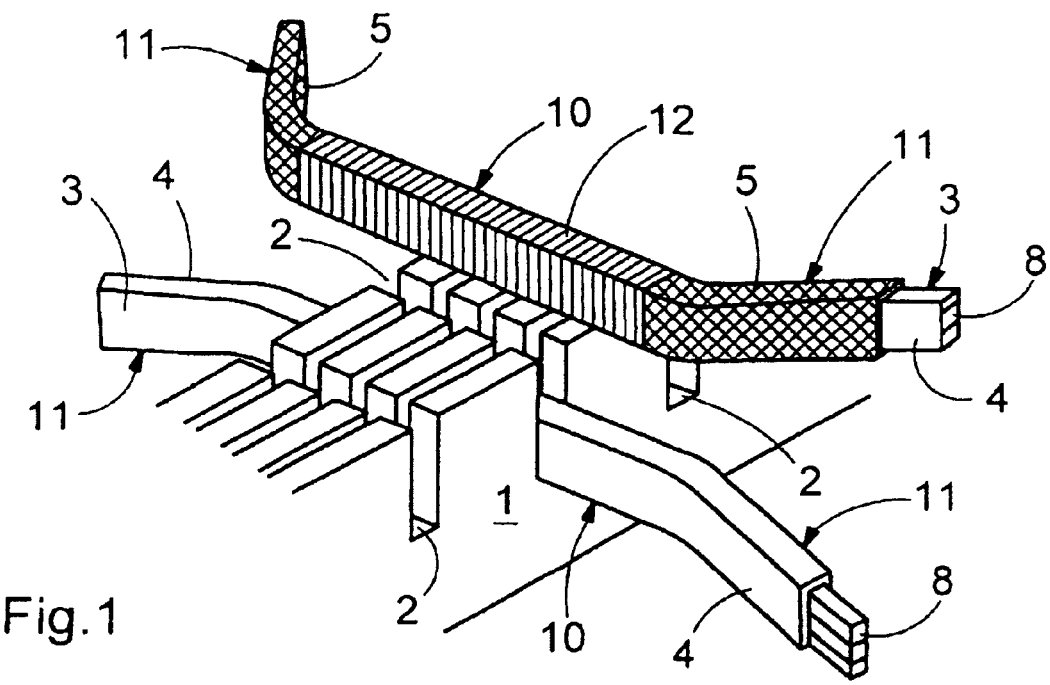
FIG. 1 an electric conductor in the area of a slot of a stator with a device according to the invention for improving the protection against surface discharges, FIG. 2 a cross section through the electric conductor with an overhang corona protection device according to the invention, FIG. 3 a partially cut-away view of the coated side of the overhang corona protection device according to the invention, and FIG. 4 a partially cut-away view of the coated side of the overhang corona protection device according to the invention illustrating fibers oriented in a machine direction.

As shown in FIG. 1, a stator 1 has several slots 2 through each of which at least one electric conductor 3 runs. The electric conductor 3 or conductor bar 3 has a slot part 10 that lies in the corresponding slot 2 as well as overhang parts 11 on both sides outside of the slot 2. The stator 1 can be made, for example, of iron, thus being electrically conductive and magnetic, and can be part of a generator and/or electric motor (not shown here). In order to prevent the current flowing in the electric conductor 3 from being transferred to the stator 1, the conductor 3 is provided with an insulation 4 that has a high electric resistance. The insulation 4 can become damaged by electric surface discharges that occur when a sufficiently high electric potential relative to the iron of the stator 1 or relative to a gas space in the area of the overhang parts 11 builds up on the surface of the insulation.

In order to improve the protection of the stator 1 or of the insulation 4 against electric corona discharges on the surface, the electric conductor 3 is surrounded in the overhang parts 11 by an overhang corona protection device 5 according to the invention. Moreover, each conductor 3 in its slot part 10 is surrounded by a slot corona protection device 12. According to the invention, the overhang corona protection device 5—or in short device 5 or overhang corona shield 5—has a non-woven substrate 6 that is made of fibers 9, that is configured so as to be electrically insulating and that has a coating 7 containing silicon carbide (SiC) applied onto it (see FIG. 3), said device 5 having a low electric conductivity that is necessary to achieve the corona protection. The coating 7 containing silicon carbide can be, for example, a curable or already cured varnish containing silicon carbide grains. This makes it possible to apply the coating 7 in a varnishing procedure, especially in a dip varnishing procedure, onto the substrate 6. The dip varnishing entails the major advantage that a continuous and uniform coating of the substrate 6 can be carried out and, at the same time, the coating 7 can be applied quickly and inexpensively. After the varnishing, the coating 7 containing silicon carbide cures, thereby creating the overhang corona shield 5 according to the invention.

In contrast to this, the slot corona protection device 12 or the slot corona shield 12 is not made with SiC but rather with a coating containing graphite and/or carbon black.

The slot corona protection device 12 as well as the overhang corona protection device 5 constitute external corona protection device and are preferably each configured as corona protection tapes that are wound around the electric conductor 3. In comparison to the slot corona shield 12, which has, for instance, a graphite filler and a resistance of approximately $10^3$ Ohm, the overhang corona shield 5 has the above-mentioned coating 7 containing silicon carbide and displays a resistance of approximately $10^8$ Ohm.

Figure 2:
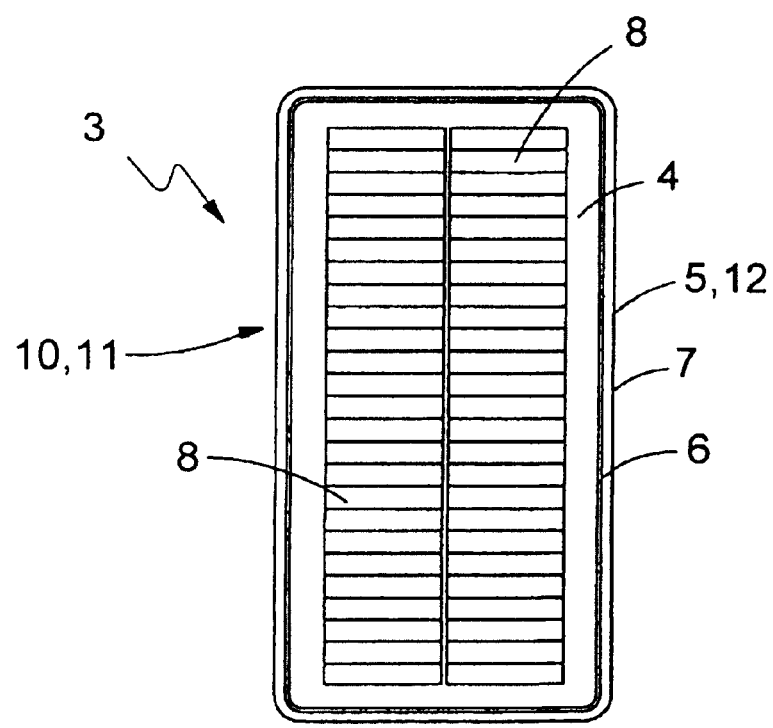

According to FIG. 2, the electric conductor 3 has several wires 8 that are combined into packets and sheathed by the insulation 4. Here, the external corona protection device 5, 12 are installed around the external surface of the insulation 4, preferably wound onto it. These external corona protection device 5, 12 are configured on the slot part 10 as a slot corona shield 12 and on the overhang parts 11 as an overhang corona shield 5 according to the invention.

Figure 3:
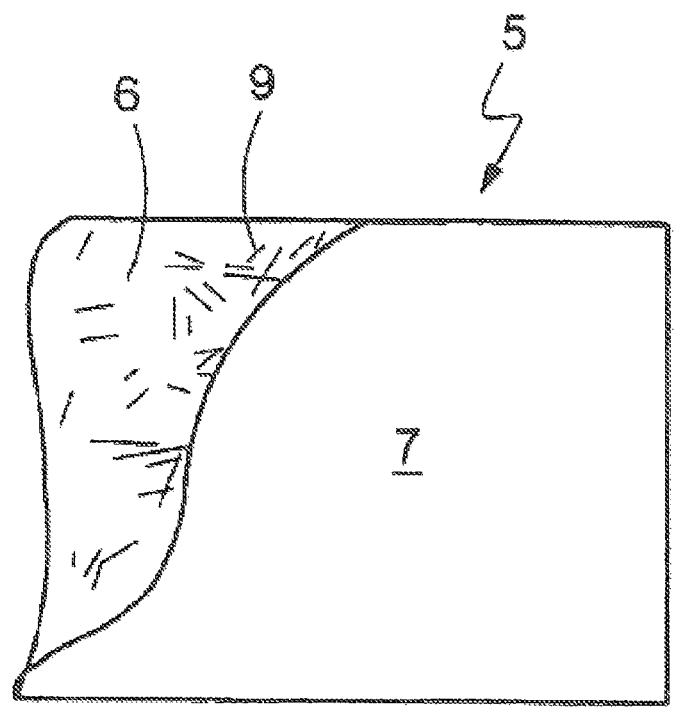
Figure 4:
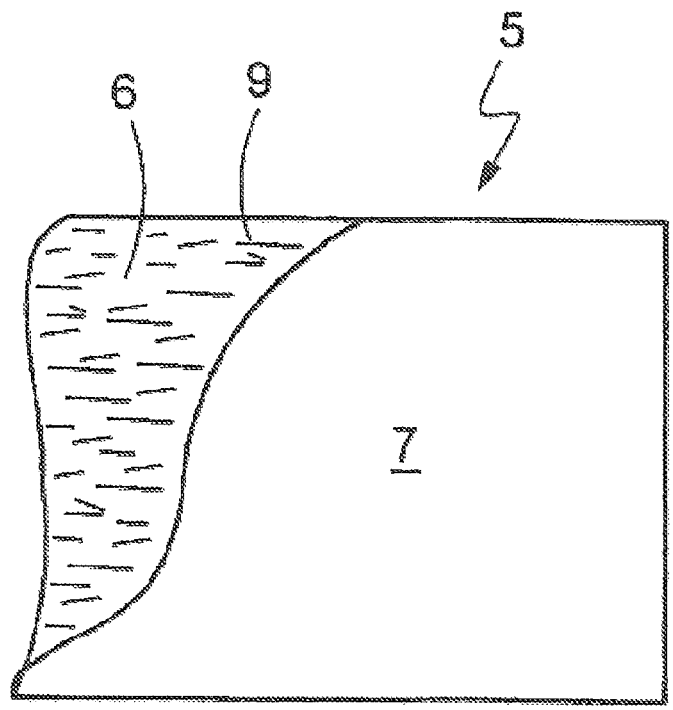

As is shown in FIG. 3, the fibers 9 are unoriented in the non-woven substrate 6, as a result of which essentially isotropic properties, especially in terms of the tensile strength, can be ensured. Here, it is also conceivable for the fibers 9 to exhibit a preferred direction and consequently for the substrate 6 to have anisotropic properties. For example, as in shown in FIG. 4, the fibers 9 can be oriented in a machine direction. Examples of fibers 9 include especially polyester fibers which, on the one hand, are inexpensive to produce and, on the other hand, are easy to process. In general, any kind of electrically insulating glass, mineral or synthetic fibers is a possibility. Depending on which fibers 9 are used, different masses per unit area ranging from about 20 g/m$^2$ or 30 g/m$^2$ up to several hundred g/m$^2$ can be realized.

In order to ensure a certain tensile load in the plane of the substrate 6, the fibers 9 are held together by a binder. Such a binder can be, for example, a reaction resin and/or another chemically activated adhesive. If thermoplastic fibers 9 are employed, these can also be joined together through heating in a thermal joining process.

By using the non-woven substrate 6 according to the invention with the coating 7 arranged thereupon, the overhang corona protection device 5 not only can be produced inexpensively, but it also offers the possibility that it can be cut simply and precisely into strips of different widths so as to create overhang corona protection tapes for winding around electric conductors 3. In contrast to overhang corona protection tapes with a woven substrate that can fray at the edges when they are cut, the overhang corona protection device 5 according to the invention retains a precise and crisp edge that does not exhibit any tendency to fray, even after being cut.

Thanks to the fact that the non-woven substrate 6 can be cut without problems, the overhang corona protection tape can be produced as a wide tape to start with, and it can then be cut according to the requirements, thus saving costs. Consequently, it is not necessary to determine the width of the overhang corona protection tape ahead of time.

What is claimed is:

1. An overhang corona protection device for improving the protection of a component against electrical corona discharges, the component having an electric conductor sheathed by an insulation layer disposed directly adjacent to the electric conductor, the overhang corona protection device consisting essentially of:
   a non-woven substrate made of fibers and configured to be electrically insulating and being disposed directly adjacent to the insulation layer; and
   a coating containing silicon carbide (SiC) disposed on the substrate.

2. The device as recited in claim 1, wherein the coating includes one of a curable varnish and a cured varnish and wherein the silicon carbide is in the form of at least one of SiC crystals and SiC grains.

3. The device as recited in claim 2, wherein the varnish is cured on the substrate.

4. The device as recited in claim 2, wherein the substrate is disposed on the component and the varnish is uncured.

5. The device as recited in claim 1, wherein the substrate has a weight of less than 100 g/m$^2$.

6. The device as recited in claim 1, wherein the substrate includes polyester fibers.

7. The device as recited in claim 1, wherein the substrate includes a binder holding the fibers together.

8. The device as recited in claim 1, wherein the device is an overhang corona protection tape.

9. An electric machine comprising:
   a stator with a slot;
   a conductor located in the slot, sheathed by an insulation layer disposed directly adjacent to the conductor and having overhanging parts; and
   an overhang corona protection device covering at least a portion of the overhanging parts, wherein the protection device comprises:
     a first layer disposed directly adjacent to the insulation layer, the first layer comprising a non-woven substrate made of fibers and configured to be electrically insulating, and
     a second layer forming an outer layer of the protection device, the second layer comprising a coating containing silicon carbide (SiC) disposed on the non-woven substrate.

10. The electrical machine as recited in claim 9, wherein the electrical machine is at least one of an electrical motor and a generator.

* * * * *